United States Patent [19]
Pavey

[11] Patent Number: 5,881,479
[45] Date of Patent: Mar. 16, 1999

[54] APPARATUS FOR COOLING A VEHICLE CARRYING A SNOWPLOW

[76] Inventor: Robert T. Pavey, 6940 Fawn Lake Dr. NE., Stacy, Minn. 55079

[21] Appl. No.: 893,963

[22] Filed: Jul. 16, 1997

[51] Int. Cl.⁶ .............................. E01H 5/00; B60K 11/06
[52] U.S. Cl. ........................... 37/241; 37/266; 180/68.1; 180/68.6
[58] Field of Search ............................ 37/279, 266, 231, 37/281, 275, 241; 180/68.1, 68.7, 68.6; 296/180.1, 180.5, 91

[56] References Cited

U.S. PATENT DOCUMENTS

| | | |
|---|---|---|
| 2,085,996 | 7/1937 | Phillips ..................................... 37/279 |
| 3,432,947 | 3/1969 | Peitl ........................................... 37/281 |
| 4,547,013 | 10/1985 | McDaniel ............................... 296/91 X |
| 4,587,750 | 5/1986 | Larson ...................................... 37/266 |
| 4,896,915 | 1/1990 | Morandi et al. ..................... 296/180.1 |
| 5,309,653 | 5/1994 | Pease et al. ............................... 37/266 |
| 5,544,434 | 8/1996 | Calvachio, Jr. ........................... 37/266 |

*Primary Examiner*—Heather Shackelford
*Attorney, Agent, or Firm*—Dicke, Billig & Czaja, P.A.

[57] ABSTRACT

An apparatus for cooling a radiator of a vehicle carrying a snowplow. The apparatus includes an air flow directing mechanism located adjacent the plow, capable of directing air flow at the radiator when the plow blade is in a riding position.

9 Claims, 4 Drawing Sheets

APPARATUS FOR COOLING A VEHICLE CARRYING A SNOWPLOW

FIELD OF THE INVENTION

The present invention relates generally to a snowplow assembly for a vehicle, and in particular, a cooling attachment for a vehicle carrying a snowplow.

BACKGROUND OF THE INVENTION

A vehicle or truck carrying a snowplow generally has the snowplow mechanically coupled to the front of the vehicle. Typically, the snowplow can be raised to a riding position or lowered to a snowplowing position using a hydraulic system coupled to the plow. The plow may be used for other reasons other than snowplowing, such as grading or excavating dirt.

When a plow is raised to the riding position, the plow blocks the front of the vehicle, and in particular, blocks the vehicle radiator behind the grill. As such, the plow blocks air flow for cooling the vehicle radiator. Yet, a vehicle works harder when carrying a snowplow, resulting in increased engine temperature, inadequate radiator cooling, and over heating of the vehicle. As a result, often times vehicle operators will raise the plow just above the ground (or snowplowing position) to maximize air flow to the vehicle radiator.

SUMMARY OF THE INVENTION

The present invention provides an apparatus for cooling a radiator in a vehicle carrying a snowplow. In one exemplary embodiment, the apparatus includes means for directing air at the radiator and means for coupling the air directing means to the snowplow.

The snowplow may include a plow blade, wherein the air directing means is coupled to the plow blade. The plow blade may include a top edge, a plow body and a bottom edge, wherein the air directing means is coupled to the top edge. The air directing means may include a first end and a second end, wherein the first end is coupled to the top edge, and wherein the second edge is coupled to the plow body. The air directing means may further include a support member centrally extending therethrough.

In one embodiment, the air directing means includes an air intake section, an air exit section, and an intermediate air transfer section. The intermediate air transfer section is located between the air intake section and the air exit section. The snowplow includes a plow blade having a top edge, wherein the air intake section is positioned above the plow blade and receives air at an air receiving location. The air passes through the intermediate air transfer section to the air exit section. The air exit section is located below the top edge. The air leaves the air exit section at a radiator cooling location.

The air directing means may be generally rectangularly shaped in cross section and include a first side portion, a center portion, and a second side portion, wherein the air exit section further includes means for redirecting air flow from the center portion of the air exit section to the first side portion and the second side portion. The redirecting air flow means is coupled to the center portion of the air exit section. In one embodiment, the redirecting air flow means is generally V-shaped, wherein the V has a pointed, closed end and an open end, and wherein the pointed, closed end is positioned upstream of the air flow.

In another embodiment, the present invention includes a snowplow assembly. The snowplow assembly comprises a plowing blade, including a mechanism for coupling the plowing blade to a vehicle. The plowing blade may include a plowing position and a riding position, the vehicle including a radiator, and wherein when the plowing blade is in the riding position, the plowing blade at least partially blocks the radiator. Means are provided for moving the plowing blade between the plowing position and the riding position. An air flow directing mechanism is located adjacent the plow, capable of directing air flow at the radiator when the plowing blade is in the riding position.

The air flow directing mechanism may be coupled to the plowing blade. Alternatively, the air flow directing mechanism may be coupled to the vehicle.

The means for moving the plowing blade between the plowing position and the riding position may be hydraulically actuated. The radiator may include a blocked portion and an unblocked portion, wherein the means for moving the plowing blade blocks a portion of the radiator, and wherein the air flow directing mechanism includes an air flow redirecting mechanism for redirecting air flow at the radiator unblocked portion, away from the radiator blocked portion. In one embodiment, the air flow redirecting mechanism is generally V-shaped.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and together with the description serve to explain the principals of the invention. Other objects of the present invention and many of the attendant advantages of the present invention will be readily appreciated as the same becomes better understood by reference to the following detailed description when considered in connection with the accompanying drawings in which like reference numerals designate like or similar parts throughout the drawing figures, and wherein.

DETAILED DESCRIPTION OF THE EMBODIMENTS

Figure 1:
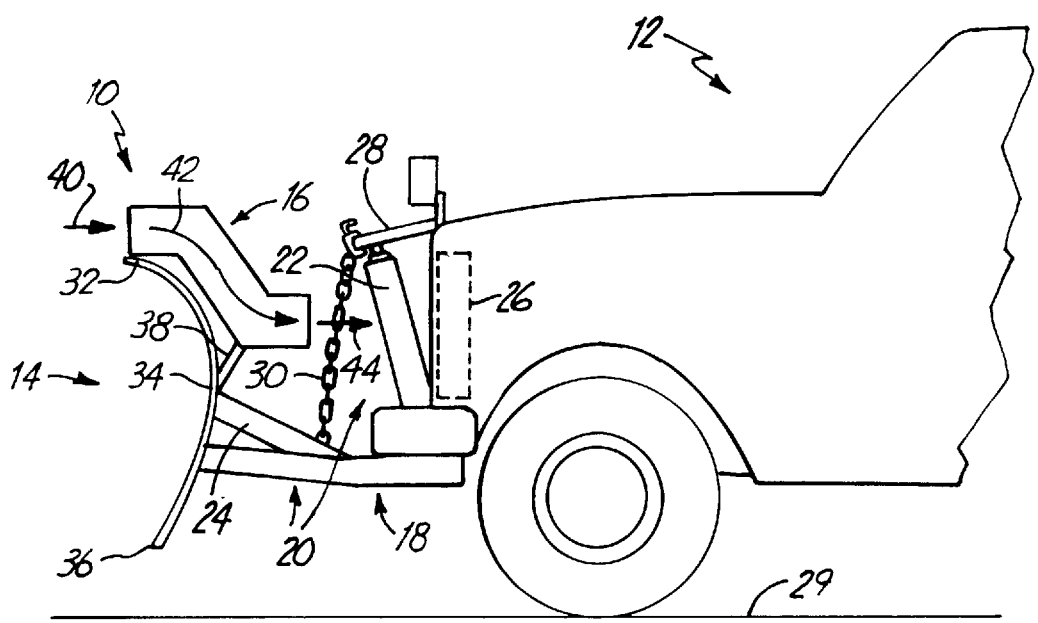
FIG. 1 is a perspective view illustrating an exemplary snowplow assembly carried by a vehicle in accordance with the present invention.

In FIG. 1, a snowplow assembly in accordance with the present invention is generally shown at 10. The snowplow assembly 10 is carried by vehicle 12 (shown in partial view). The snowplow assembly 10 includes plow blade 14, air flow directing mechanism or means 16, plow coupling mechanism 18, and a hydraulic system 20, including first hydraulic mechanism 22 and second hydraulic mechanism 24. Further, vehicle 12 includes a radiator, indicated by dashed lines 26.

In one exemplary embodiment shown, plow coupling mechanism 18 secures the snowplow assembly 10, and in particular, plow blade 14, to the front of the vehicle 12. Plow coupling mechanism 18 may be, for example, a generally A-frame shaped support member. Hydraulic system 20 provides for control of the snowplow assembly 10 from a location inside the vehicle 12. In operation, bracket 28 extends from vehicle 12, and is mechanically coupled to plow coupling mechanism 18 through chain 30. First hydraulic mechanism 22 is positioned between bracket 28 and vehicle 12. As such, actuation of first hydraulic mechanism 22 operates to move the plow blade 14 between a riding position (as shown) and a plowing position, wherein the plow blade 14 contacts the ground or snow (indicated at 29). Further, the second hydraulic mechanism 24 is coupled between plow coupling mechanism 18 and plow blade 14. As such, second hydraulic mechanism 24 may be selectively actuated to control movement of plow blade 14. In particular, second hydraulic mechanism 24 may be actuated to pivot plow blade 14 about a longitudinal axis as defined by a pivot point where plow coupling mechanism 18 is pivotally coupled to plow blade 14.

Air flow directing mechanism 16 is mechanically coupled to plow blade 14. In particular, plow blade 14 includes top edge 32, plow body 34, and bottom edge 36. In the exemplary embodiment shown, air flow directing mechanism 16 is mechanically coupled to the plow blade top edge 32, such as by a bolted or welded connection. Further, support bracket 38 extends between plow body 34 and air flow directing mechanism 16, providing additional support to air flow directing mechanism 16.

In operation, as vehicle 12 travels with plow blade 14 in a riding position, air flow is blocked by plow blade 14 for cooling of radiator 26. As such, air flow directing mechanism 16 operates to redirect air flow at radiator 26. In particular, air enters the air flow directing mechanism 16 at a location above the plow blade top edge 32, indicated by air flow arrow 40. Air flow is redirected as it passes through air flow directing mechanism 26, indicated by air flow arrow 42. Redirected air flow exits air flow directing mechanism 16, directed at radiator 26, as indicated by air flow arrow 44. Air flow directing mechanism 16 is described in detail in the following paragraphs. Air flow directing mechanism 16 operates to direct air flow at radiator 26, and may be designed to increase the volume and/or velocity of air flow to the radiator when the plow is in a riding position.

It is recognized that air flow directing mechanism 16 may be mechanically coupled to other parts of snowplow assembly 10 or vehicle 12. For example, air flow directing mechanism 16 may be mechanically coupled to bracket 28 adjacent hydraulic system 20, or plow coupling mechanism 18. Air flow directing mechanism 16 would continue to function to redirect air flow at radiator 26, as previously described herein.

Figure 2:
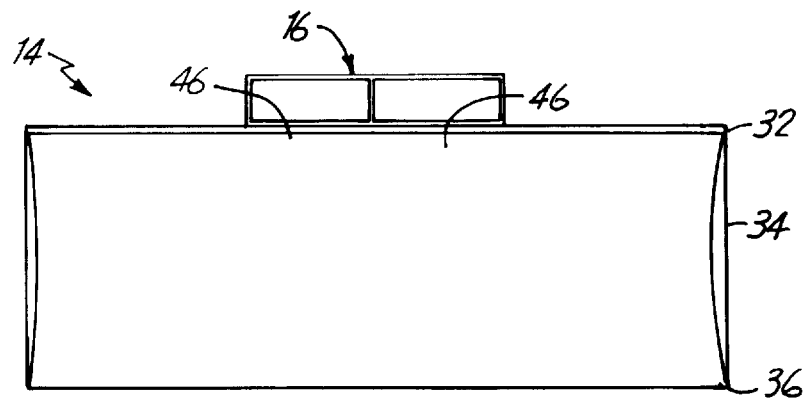
FIG. 2 is a front view of the snowplow blade of FIG. 1.

Referring to FIG. 2, a front view of plow blade 14 is shown, having air flow directing mechanism 16 mounted thereon. As shown, air flow directing mechanism 16 is mechanically coupled to plow blade top edge 32, as indicated by bolted connection 46.

Figure 3:
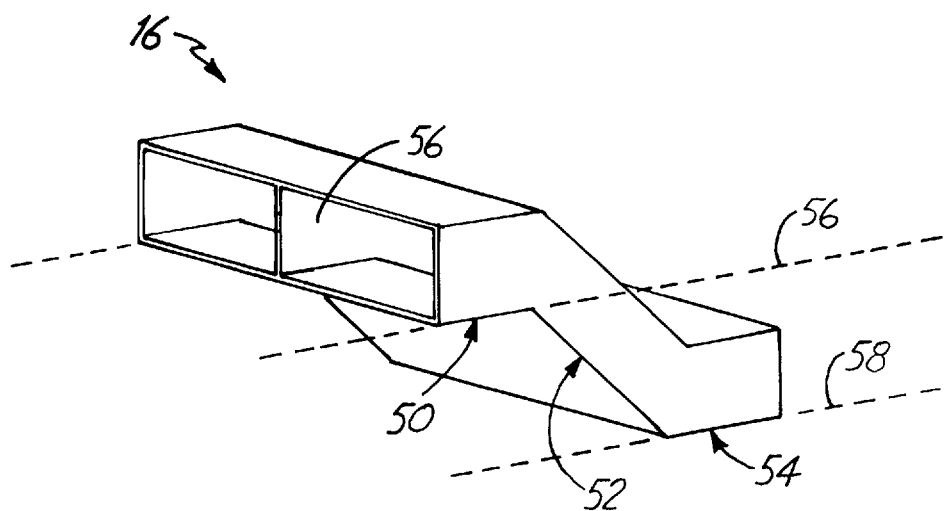
FIG. 3 is a perspective view of an air directing mechanism for use with a snowplow assembly in accordance with the present invention.

Referring to FIG. 3, a perspective view illustrating one exemplary embodiment of air flow directing mechanism 16 is generally shown. In the exemplary embodiment shown, air flow directing mechanism 16 is generally rectangular in cross section, having a width of approximately forty inches and a height of six inches. It is recognized that other more aerodynamic designs may be employed, such as the use of curved or louvered surfaces. Air flow directing mechanism 16 includes air intake section 50, air transfer section 52, and air exit section 54. Air intake section 50 may include support member 56 centrally disposed therethrough. Air intake section 50 is located at a first horizontal position, indicated by dashed line 56. Air flow directing mechanism 16 then transitions downward through air transfer section 52 to a second horizontal position, indicated by dashed line 58. In one preferred embodiment, the first horizontal position 15 is located above plow blade top edge 32, and the second horizontal position 58 is located below the plow blade top edge 32, and directed at radiator 26 (as shown in FIG. 1).

In one preferred embodiment, air flow directing mechanism 16 is formed of sheet metal. It is recognized that other materials may be employed while remaining within the scope of the present invention. For example, other suitable materials include fiberglass or plastic.

Figure 4:
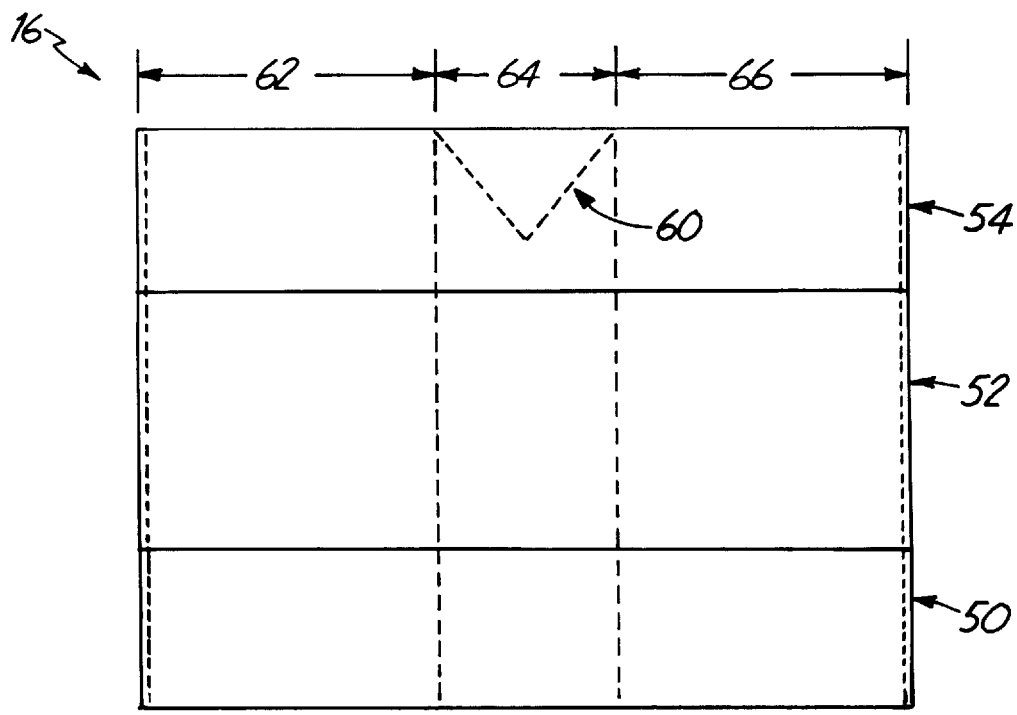
FIG. 4 is a top view of the air directing mechanism of FIG. 3.

Referring to FIG. 4, a top view of the air flow directing mechanism 16 in FIG. 3 is shown. Air flow directing mechanism 16 may include an air flow redirecting mechanism 60 (shown in dashed lines). Due to the presence of equipment in front of the center of the radiator 26, it may be desirable to redirect air flow away from the center of the radiator to maximize cooling of the radiator. In particular, the air flow directing mechanism 16 includes first side portion 62, center portion 64, and second side portion 66. In the exemplary embodiment shown, air flow redirecting mechanism 60 is V-shaped. Air flow redirecting mechanism 60 is positioned within air exit section 54, with the closed end of the V pointed upstream. As such, as air flow passes through air flow directing mechanism 16, air flow which enters first side section 62 and second side section 66 at air intake section 50 and exits first side portion 62 and second side portion 66, respectively, at air exit section 54. Further, air flow which enters center portion 64 is redirected to exit first side portion 62 and second side portion 66.

Figure 5:
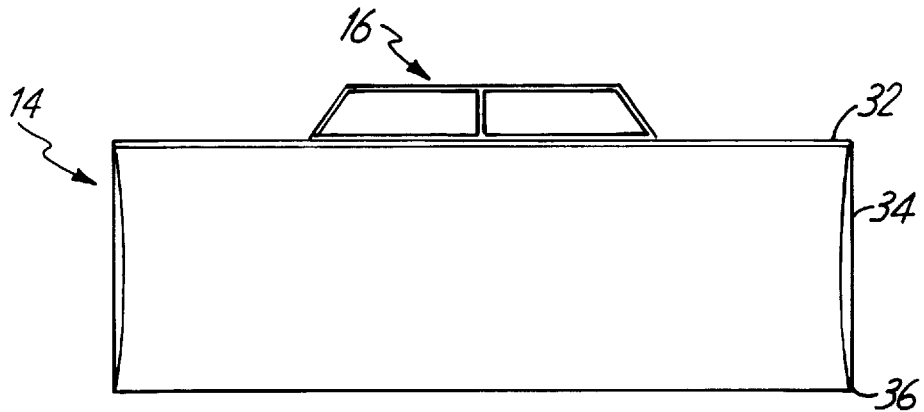
FIG. 5 is a front view of a snowplow blade illustrating another exemplary embodiment of the air directing mechanism in accordance with the present invention.

Referring to FIG. 5, and as previously described herein, it is recognized that other shapes may be employed for air flow directing mechanism 16. In the exemplary embodiment shown, the air flow directing mechanism 16 air intake section 50 has a more aerodynamically shaped cross section, which extends outward as it meets with top edge 32 of plow blade 14. In another exemplary embodiment, air flow directing mechanism 16 may include one or a plurality of louvers horizontally positioned therein to aid in directing air flow at vehicle 12 (and preferably radiator 26).

Figure 6:
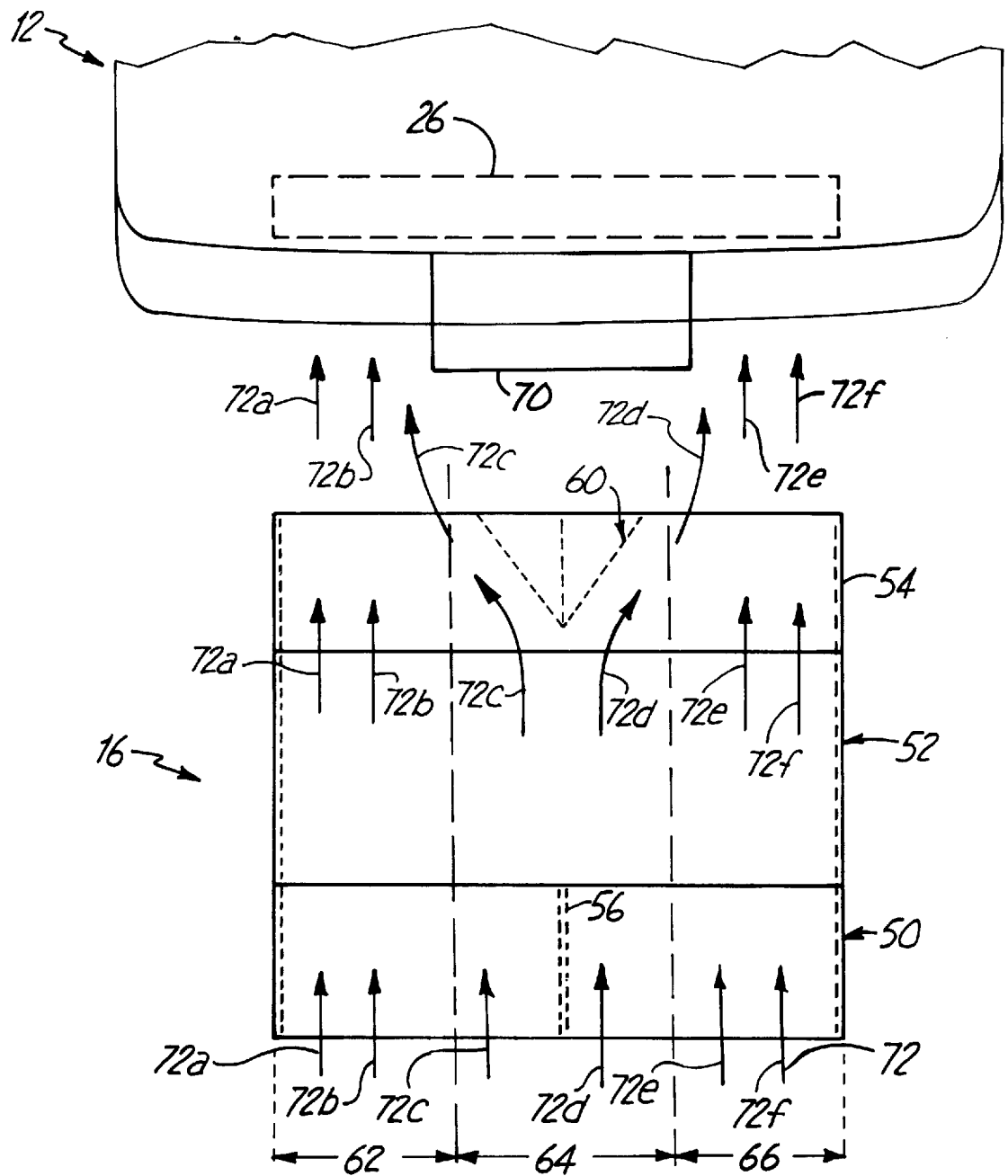
FIG. 6 is an air flow diagram illustrating operation of an air flow mechanism in accordance with the present invention.

Referring to FIG. 6, an air flow diagram illustrating one exemplary embodiment of air flow through air flow directing mechanism 16 is generally shown in top view. It is recognized that snowplow assembly 10 items, such as parts of the plow coupling mechanism or hydraulic system may be centrally positioned in front of radiator 26, as indicated by block 70. As such, air flow directing mechanism 16 may operate to redirect air flow around item 70 to maximize air flow and cooling of radiator 26 when plow blade 14 is in a riding position.

In operation, as vehicle 12 moves forward with plow blade 14 in a riding position, air enters air flow directing mechanism 16 at air intake section 50, indicated by air flow arrows 72a, 72b, 72c, 72d, 72e and 72f. Referring also to FIG. 3, air flow passes through air transfer section 52, moving from first horizontal position 56 to second horizontal position 58 (shown in FIG. 3). Within air exit section 54, air flow 72a, 72b and 72e, 72f exit air exit section 54 first side portion 62 and second side portion 66, respectively. Additionally, air flow 72c and 72d is redirected away from center portion 64 by air flow redirecting mechanism 60 to also exit first side portion 62 and second side portion 66, respectively. As such, air flow is directed at vehicle 12 for maximum cooling of radiator 26.

It will be understood that this disclosure is, in many respects, only illustrative. Changes may be made in details, particularly in matters of shape, size, material, and arrangement of parts, without exceeding the scope of the invention. Accordingly, the scope of the invention is as defined in the language of the appended claims.

What is claimed:

1. An apparatus for cooling a radiator of a vehicle carrying a snowplow, the apparatus comprising:

means for directing air at the radiator;

means for coupling the air directing means to the snowplow;

wherein the snowplow includes a plow blade, and the air directing means is coupled to the plow blade;

wherein the plow blade includes a top edge, a plow body and a bottom edge, and wherein the air directing means is coupled to the top edge;

wherein the air directing means includes a first end and a second end, wherein the first end is coupled to the top edge, and wherein the second end is coupled to the plow body.

2. An apparatus for cooling a radiator of a vehicle carrying a snowplow, the apparatus comprising:

means for directing air at the radiator, wherein the air directing means includes an air intake section, an air exit section, and an intermediate air transfer section, wherein the intermediate air transfer section is located between the air intake section and the air exit section; and means for coupling the air directing means to the snowplow, wherein the air directing means is generally rectangular shaped and includes a first side portion, a center portion, and a second side portion, and wherein the air exit section further includes means for redirecting air flow from the center portion of the air exit section to the first side portion and the second side portion.

3. The apparatus of claim 2, wherein the redirecting air flow means is coupled to the center portion of the air exit section.

4. An apparatus for cooling a radiator of a vehicle carrying a snowplow, the apparatus comprising:

means for directing air at the radiator;

means for coupling the air directing means to the snowplow;

wherein the air directing means includes an air intake section, an air exit section, and an intermediate air transfer section, wherein the intermediate air transfer section is located between the air intake section and the air exit section;

wherein the air directing means is generally rectangular shaped and includes a first side portion, a center portion, and a second side portion, and wherein the air exit section further includes means for redirecting air flow from the center portion of the air exit section to the first side portion and the second side portion; and wherein the redirecting air flow means is generally V-shaped.

5. The apparatus of claim 4, wherein the V has a pointed, closed end and an open end, and wherein the pointed, closed end is positioned upstream of the open end.

6. A snowplow assembly comprising:

a plowing blade including a mechanism for coupling the plowing blade to a vehicle, wherein the plowing blade includes a plowing position and a riding position, the vehicle including a radiator, and wherein when the plowing blade is in the riding position, the plowing blade at least partially blocks the radiator;

means for moving the plowing blade between the plowing position and the riding position;

an air flow directing mechanism located adjacent the plow, capable of directing air flow at the radiator when the plowing blade is in a riding position; and wherein the radiator includes a blocked portion and an unblocked portion, and wherein the means for moving the plow blade blocks a portion of the radiator, and wherein the air flow directing mechanism includes an airflow redirecting mechanism for redirecting air flow at the radiator unblocked portion, away from the radiator blocked portion; and wherein the air flow redirecting mechanism is generally V-shaped.

7. The snowplow assembly of claim 6, wherein the air flow directing mechanism is coupled to the plowing blade.

8. The snowplow assembly of claim 6, wherein the air flow directing mechanism is coupled to the vehicle.

9. The snowplow assembly of claim 6, wherein the means for moving the plowing blade between the plowing position and the riding position is hydraulically actuated.

* * * * *